United States Patent [19]
Kim

[11] Patent Number: 5,815,423
[45] Date of Patent: Sep. 29, 1998

[54] PARALLEL PROCESSING DIVISION CIRCUIT

[75] Inventor: Young-chul Kim, Seoul, Rep. of Korea

[73] Assignee: Samsung Electronics Co., Ltd., Kyungki-Do, Rep. of Korea

[21] Appl. No.: 638,862

[22] Filed: Apr. 29, 1996

[30] Foreign Application Priority Data

Oct. 31, 1995 [KR] Rep. of Korea ................ 1995-38701

[51] Int. Cl.[6] .................................................. G06F 7/52
[52] U.S. Cl. ............................................................ 364/766
[58] Field of Search .................................... 364/766, 767

[56] References Cited

U.S. PATENT DOCUMENTS

5,097,435  3/1992  Takahashi ................ 364/766
5,317,531  5/1994  Zaidi ....................... 364/766
5,574,677  11/1996  Cohen ...................... 364/766

*Primary Examiner*—David H. Malzahn
*Attorney, Agent, or Firm*—Cushman Darby&Cushman IP Group of Pillsbury Madison & Sutro LLP

[57] ABSTRACT

A parallel processing division circuit performing fast divisions is provided. The division circuit includes a time control circuit, data register, data select circuit, subtractor, control signal generating unit, and outcome data generating circuit. The combination of the circuits provides a hardware method of calculating divisions, which is faster than a software method, with quotient values less than one.

26 Claims, 7 Drawing Sheets

PARALLEL PROCESSING DIVISION CIRCUIT

BACKGROUND OF THE INVENTION

1. Field of Invention

The present invention relates generally to a parallel processing division circuit, and more particularly, to a parallel processing division circuit wherein the quotient is to be less than one because the dividend is smaller than the divisor.

2. Description of Related Art

Generally, calculating machines use software to perform addition, subtraction, multiplication and division, because although hardware is faster than software, it is quite complicated to construct a machine using hardware. A digital circuit for performing division is particularly complicated where the quotient is a value less than one.

The object of the present invention is to provide a simple parallel processing circuit, to perform divisions, which is formed from hardware and designed to perform division in which the quotient is less than one—i.e., the dividend is less than the divisor.

SUMMARY OF THE INVENTION

A parallel processing division circuit of the present invention achieves the above purpose by receiving dividend data, divisor data which is larger than the dividend data, a starting signal and a reset signal, and outputting the quotient.

The circuit includes a time control circuit which receives the starting signal and a clock signal and outputs a time control signal which controls a time to output outcome data.

A data register receives the divisor data and outputs divisor storing data which is the inverse of the divisor data and is synchronized with the clock signal according to the starting signal.

A data select receives the dividend data, the starting signal and the clock, and selects data among: (1) the dividend data, (2) existing selected data shifted to the left one bit according to the starting signal, and (3) data which is shifted data, which the divisor storing data is subtracted from the existing selected data, to the left one bit. The data select outputs the select data and control data.

A subtractor receives the divisor storing data and the select data, performs subtraction, and outputs subtraction outcome data and an output carry which indicates if overflow has occurred as a result of the subtraction.

A control signal generating circuit receives the time control signal, the control data and the output carry, and outputs a select control signal having a high logic value when the time control signal has a high logic value and when one of the control data and the output carry has a high logic value.

An outcome data generating circuit receives the time control signal, the select control signal, is synchronized with the clock according to the time control signal, stores the select control signal and outputs data by shifting the select control signal to the left one bit by one bit.

BRIEF DESCRIPTION OF THE DRAWINGS

The preferred embodiments of the present invention will now be described more specifically with reference to the attached drawings, wherein.

DETAILED DESCRIPTION OF THE PREFERRED EMBODIMENTS

Figure 1:
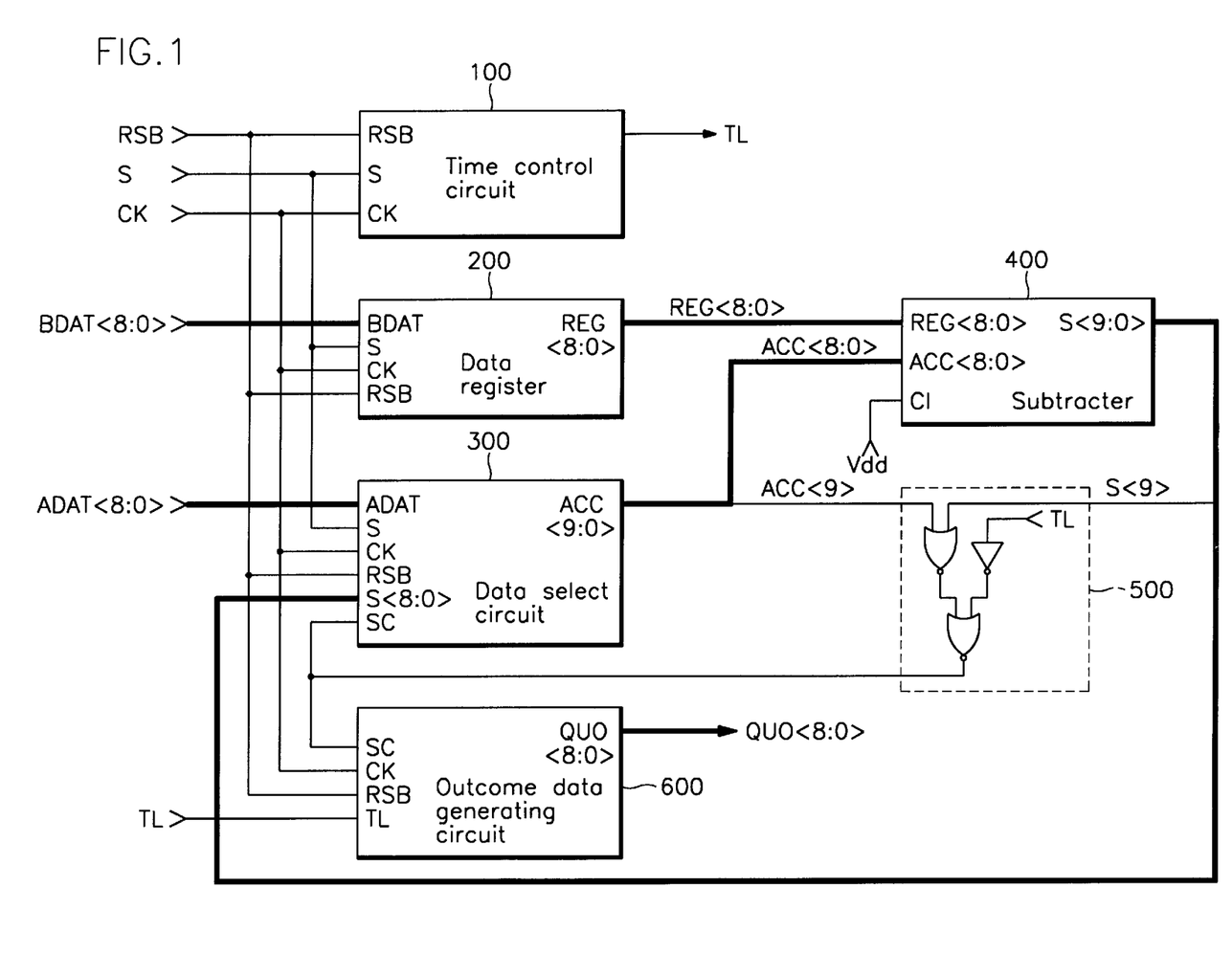
FIG. 1 is a block diagram illustrating a preferred embodiment of the parallel processing division circuit of the present invention.

FIG. 1 is a block diagram illustrating a parallel processing division circuit of the present invention. As shown in FIG. 1, a preferred parallel processing division circuit includes a time control circuit 100 which receives a reset signal RSB, a starting signal S and a clock signal CK. The time control circuit outputs a time control signal TL adjusting a time to output data as a result of division.

A data register 200 receives divisor data BDAT<8:0>, the starting signal S and the clock signal CK, and outputs divisor storing data REG<8:0>, which is synchronized with the clock signal CK according to the starting signal S, and the inverse of the divisor data BDAT<8:0>.

A data select circuit 300 receives dividend data ADAT<8:0>, subtraction output data S<8:0>, the starting signal S and the clock signal CK, and selects data equal to the dividend data ADAT<8:0> or previously existing subtraction output data shifted to the left one bit according to the starting signal S, and outputs a select data ACC<8:0> and control data ACC<9>.

A subtractor 400 receive the divisor storing data REG<8:0> from the data register 200 and the select data ACC<8:0> from the data select circuit 300, to perform subtraction and to output subtraction outcome data S<8:0> and output carry S<9>.

A control signal generating circuit 500 receives a time control signal TL, the control data ACC<9> from the data selector 300 and the output carry S<9> from the subtractor 400, and outputs a select control signal SC having a high logic value when the time control signal TL has a high logic value, and when the control data ACC<9> or the output carry S<9> has a high logic value.

An outcome data generating circuit 600 receives the time control signal TL, the select control signal SC and the clock signal CK, is synchronized with the clock signal CK according to the time control signal TL, and stores the select control signal SC, to shift it to the left by one bit and outputs outcome data QUO<8:0>.

Figure 2:
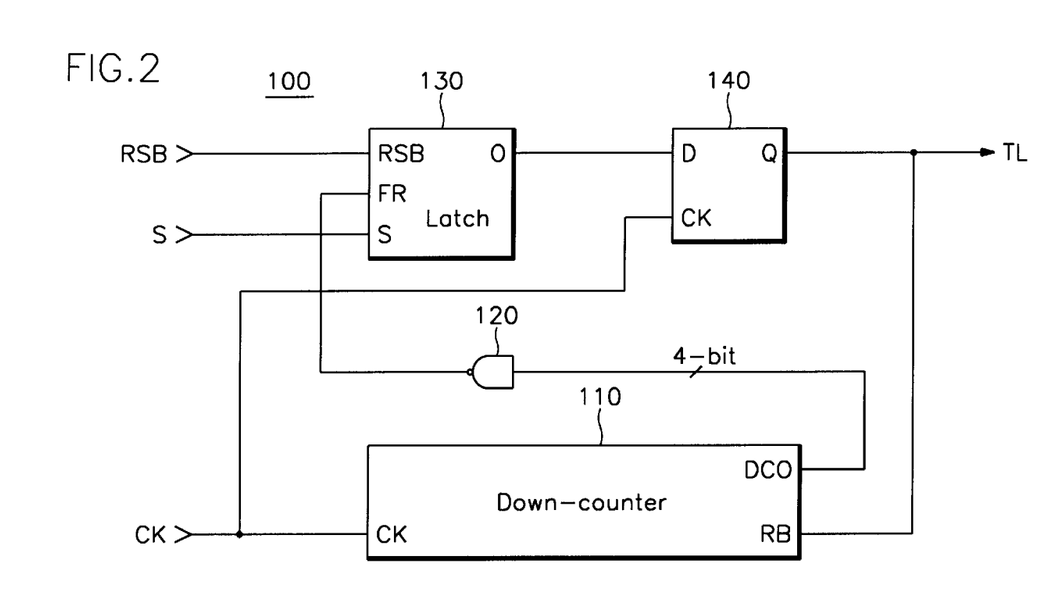
FIG. 2 is a block diagram illustrating a time control circuit 100 of the parallel processing division circuit used by the embodiment of present invention shown in FIG. 1.

FIG. 2 is a block diagram illustrating a time control circuit 100 of the parallel processing division circuit of the present invention. As shown in FIG. 2, the time control circuit 100 includes a down-counter 110 to incrementally count down according to a clock signal CK.

A detector 120 outputs a first reset signal FR by detecting the value when an output of the down-counter 110 has a fixed value.

A latch circuit 130 receives a reset signal RSB, a starting signal S and the first reset signal FR. This latch circuit 130 is set to output a low logic value, when the reset signal RSB or the first reset signal FR is active, and to output a high logic value when the starting signal S is active.

A flip-flop receives the output of the latch 130, and the clock signal CK and outputs a time control signal TL in synchronism with the clock signal CK.

The time control signal TL is connected to the reset branch RB of the down-counter 110 and causes the down-counter to be reset when the time control signal TL has a low logic value.

The detector 120 may be formed from a NAND circuit. Because the divisor data in the parallel processing division circuit of the present invention illustrated in FIG. 1 has nine bits, the detector 120 detects the value output from the down-counter 110 and outputs a low logic value when the output is equal to a decimal value of 10.

Figure 3:
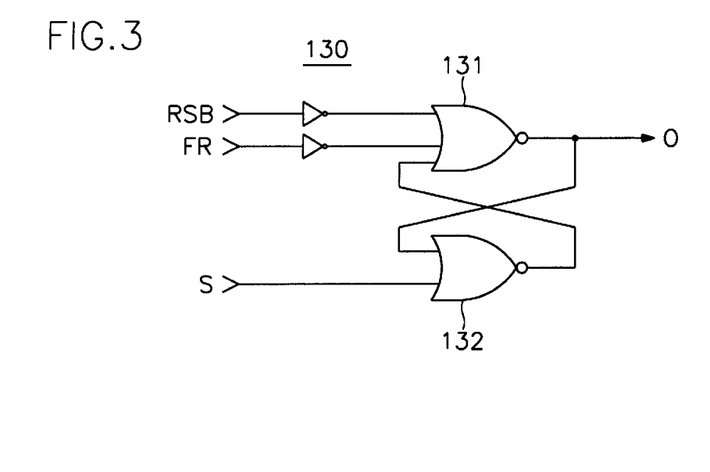
FIG. 3 illustrates a latch circuit of the parallel processing division circuit used by the embodiment of present invention shown in FIG. 1.

As shown in FIG. 3, the latch circuit 130 has a first NOR gate 131 having first, second and third inputs, and a second NOR gate 132 having first and second inputs. The first input of the first NOR gate 131 is connected to a signal which is the inverse of the reset signal RSB. The second input of the first NOR gate 131 is connected to the first reset signal FR. The third input of the first NOR gate 131 is connected to the output of the second NOR gate 132. The first input of the second NOR gate 132 is connected to the output of the first NOR gate 131, and the second input of the second NOR gate 132 is connected to a starting signal S.

Figure 4:
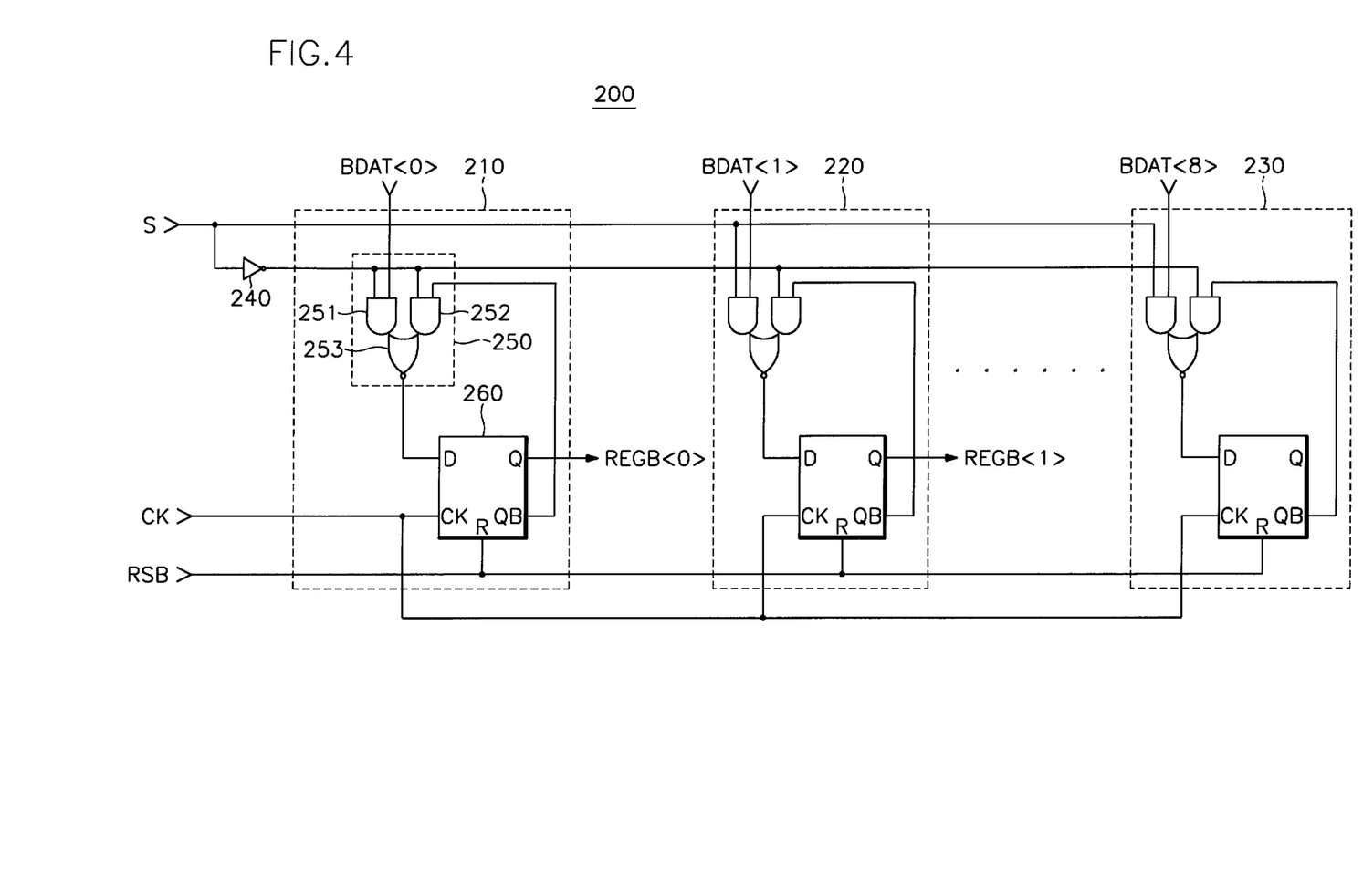
FIG. 4 illustrates a data register of the parallel processing division circuit used by the embodiment of present invention shown in FIG. 1.

FIG. 4 illustrates a data register of a parallel processing division circuit of the present invention. The data register 200 includes an inverter 240 to receive several bits of divisor data BDAT<8:0> and a starting signal S, to invert and to output them. Each register 210, 220, 230 respectively includes a divisor data logic 250, a clock branch C, an input branch D, a reset branch R, a first output Q and a flip-flop having a second output QB which is the inverse of the first output Q.

The divisor data logic 250 includes first and second AND gates 251, 252 and a third NOR gate 253 having first and second inputs. The first input of the first AND gate 251 is connected to the starting signal S, and the second input of the first AND gate 251 is connected to one bit of the divisor data BDAT<8:0>. The first input of the second AND gate 252 is connected to the output of the inverter 240, and the second input of the second AND 252 is connected to the second output QB of the flip-flop 260. The first input of the third NOR gate 253 is connected to the output of the first AND gate 251 and the second input of the third NOR gate 253 is connected the output of the second AND gate 252.

Figure 5:
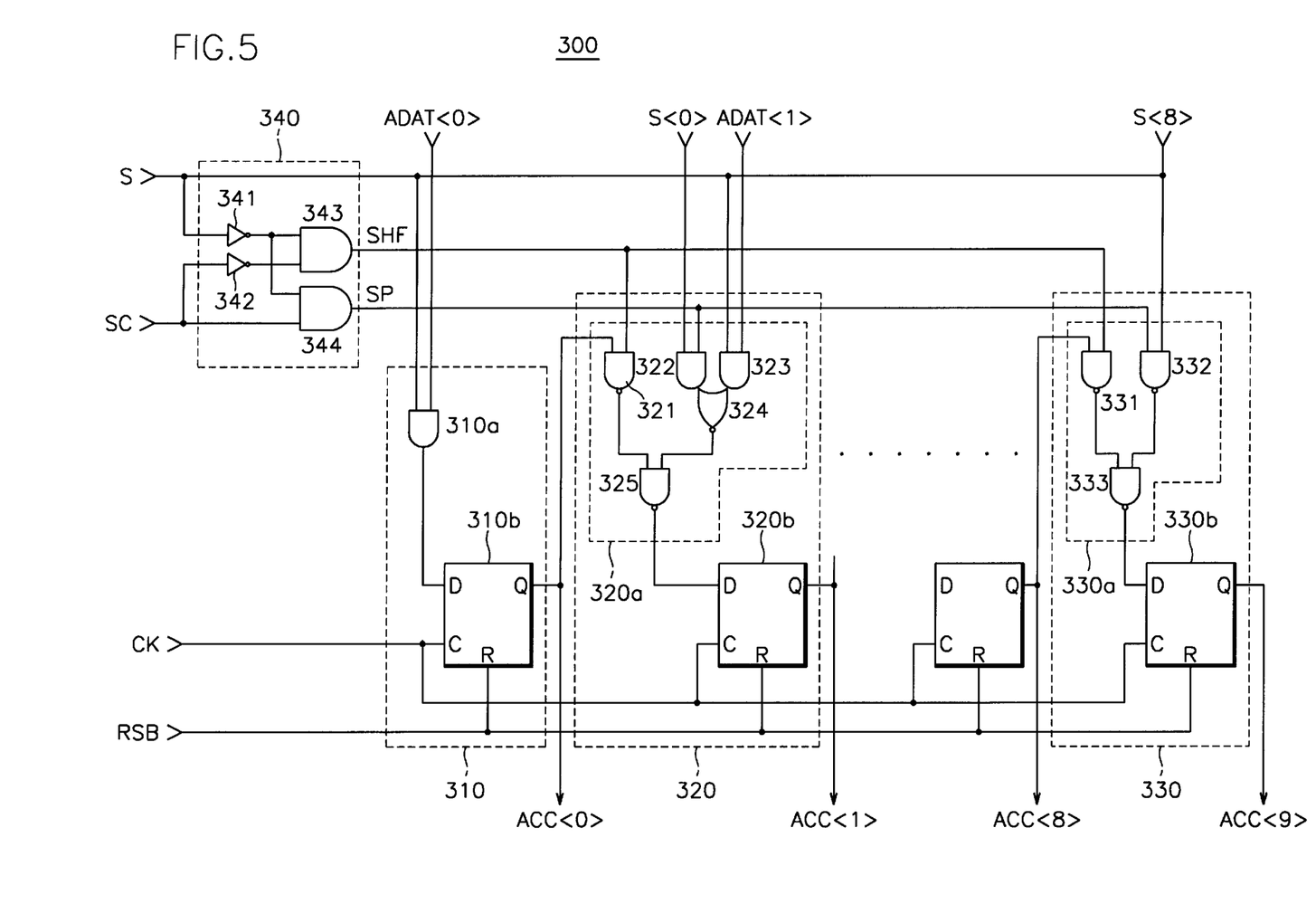
FIG. 5 illustrates a data select circuit of the parallel processing division circuit used by the embodiment of present invention shown in FIG. 1.

FIG. 5 illustrates a data select circuit 300 of the parallel processing division circuit of the present invention. The data select circuit 300 includes a select control signal generating circuit 340 which receives a starting signal S and a select control signal SC and which outputs a second control signal SP.

Several select registers 310, 320, 330 are provided such that there is one more select register than the number of bits of dividend data ADAT<8:0>. The select registers output select data ACC<8:0> and control data ACC<9>.

The select control generating circuit 340 includes first and second inverters 341, 342, and third and fourth AND gates 343, 344. The first inverter 341 receives the starting signal S and outputs its inverse. The second inverter 342 receives the select control signal SC, inverts it and outputs a shift control signal SH. The third AND gate 343 performs a logical AND operation between the output signals from the first and second inverters and outputs a first control signal SHF. The fourth AND gate 344 performs the logical AND operation between the output of the first inverter 341 and the select control signal SC, and outputs a second control signal SP.

Each select registers 310, 320, 330 respectively has a dividend data logic 310a, 320a, 330a, and a flip-flop 310b, 320b, 330b having a clock branch C, an input branch D, a reset branch R and an output branch Q. The clock branch C and the reset branch R are respectively connected to the clock signal CK and the reset signal RSB.

The input branch D of the respective flip-flop 310a, 320a, 330a is connected to a respective output of the dividend logic 310a, 320a, 330a. The output branch Q of a respective flip-flop is output to a successive dividend data logic.

The divided data logic 310a is formed from an AND gate which performs the logical AND function between the starting signal and the lowest data bit ADAT<0>.

The last divided data logic 330a includes a first NAND gate 331 to receive the output Q of the flip-flop from the branch immediately before it and a first control signal SHF, and performs a logical NAND operation between these two signals. A second NAND gate 332 is provided which receives the highest bit S<8> from the subtraction outcome data S<8:0> output from subtractor 400 and a second control signal SP, and performs a logical NAND operation on these two signals. A third NAND 333 receives the outputs of the first and second NAND gates 331, 332, and performs a logical NAND operation on the signals.

The other dividend data logics each have a NAND gate 321 which receives the output D from the flip-flop from the previous branch and a first control signal SHF and performs a logical NAND operation on these two signals. An AND gate 322 receive one bit of subtraction outcome data S<0>–S<7>, but not the highest bit S<8>, from the subtractor 400, and a second control signal SP, and performs a logical AND operation on these two signals.

Another AND gate 323 receives the start signal S and one bit of dividend data ADAT<1>–ADAT<8>, but not the lowest bit ADAT<0>, and performs the logical AND operation on these two signals. A NOR gate 324 receives the outputs of the AND gates 322, 323, and performs a logical NOR operation on them. A NAND gate 325 receives the output from the NAND gate 321 and the NOR gate 324 and performs a logical NAND operation on these signals.

Figure 6A:
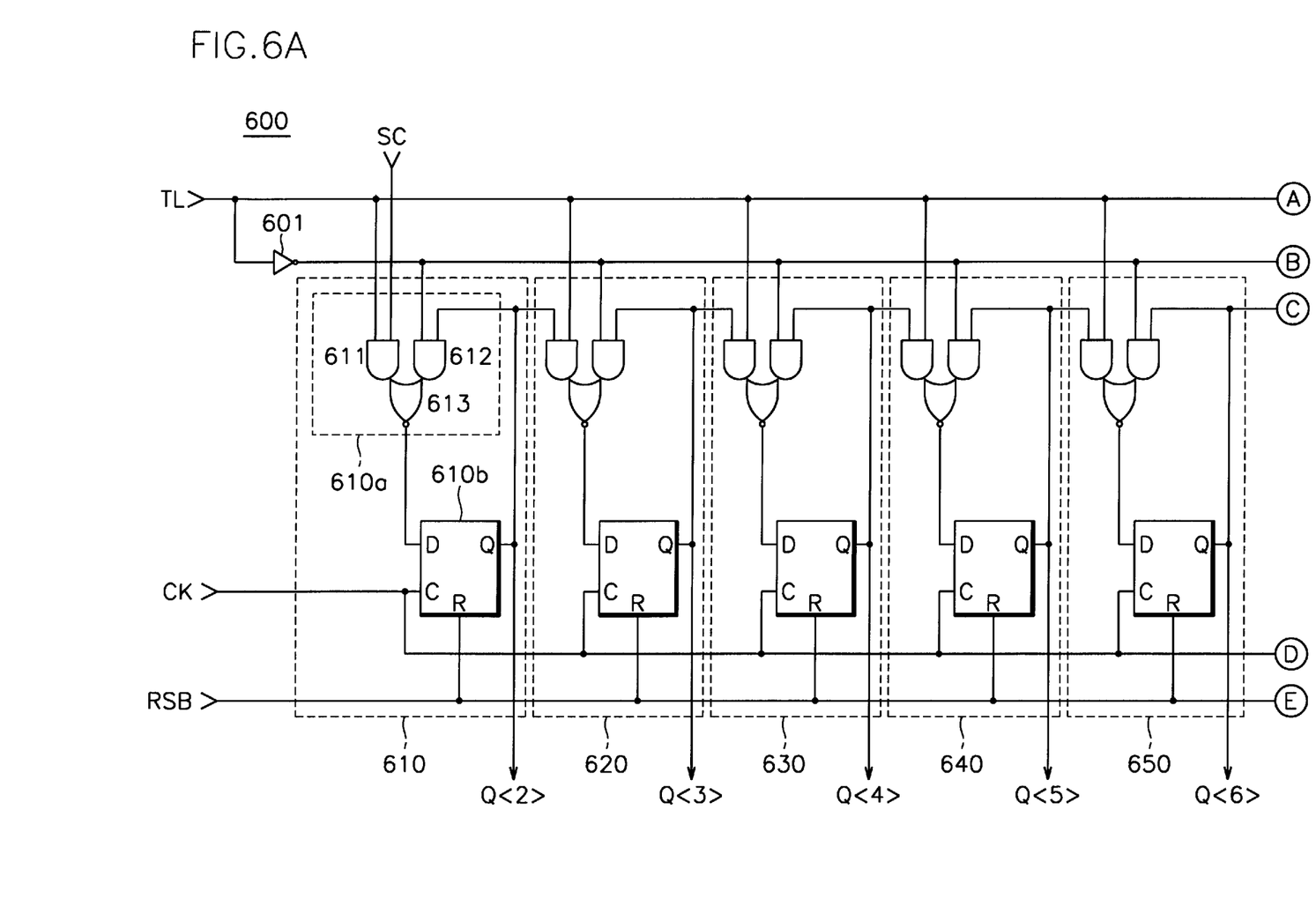
FIGS. 6A and 6B together form one circuit which illustrates an outcome data generating circuit of the parallel processing division circuit used by the embodiment of present invention shown in FIG. 1.
Figure 6B:
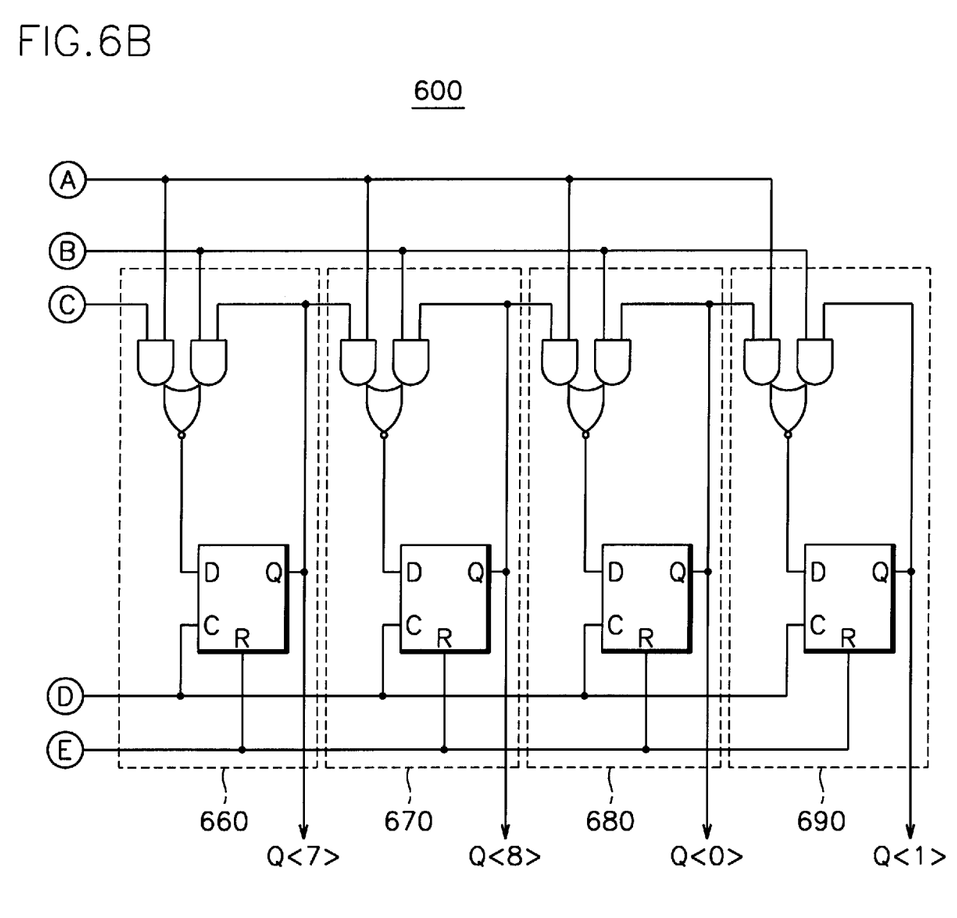

FIGS. 6A and 6B illustrate one embodiment of an outcome data generating circuit 600 to be used in the embodiment of the present invention shown in FIG. 1. The outcome data generating circuit 600 includes an inverter 601 which receives a time control signal TL, inverts it and outputs an inverse control signal ITL.

The outcome data generating circuit 600 also includes several outcome data registers 610–690, which respectively have outcome data logics 610a–690a and flip-flops 610b–690b, each of which has a clock branch C, an input branch D, a reset branch R, and an output branch Q.

The outputs Q of the flip-flops form the outcome data QUO<8:0>. The input branch D of each flip-flop is connected to its respective outcome data logic 610a–690a. The reset branch R and the clock branch C are respectively connected to the reset signal RSB and the clock signal CK.

The outcome data logic 610a of the first outcome data register 610 includes an AND gate 611 which receives the select control signal SC and the time control signal TL as inputs and which performs a logical AND operation on these two input signals.

The outcome data logic 610a further includes an AND gate 612 which receives the inverse time control signal ITL and the output of the flip-flop 610b, QUO<2>, as inputs and performs a logical AND operation on the two signals. A NOR gate 613 receives the outputs of the AND gates 611, 612, and performs a logical OR operation on these two signals.

Each outcome data logic 620a–690a of the other outcome data registers 620–690 are identical to the outcome data logic 610a of the first outcome data register 610, except that the output of the flip-flop from the outcome data logic which operates on the adjacent lower bit forms the input to the AND gate 621–691 instead of the select control signal SC.

In a time control circuit 100 of a parallel processing division circuit illustrated in FIG. 2, a reset signal RSB has a low logic value for refreshing at the beginning, so that the output of a latch circuit 130 may output a low logic value, a time control signal which is the output of a flip-flop 140 may output a low logic value, and a down-counter 110 may be reset and output 0 decimal.

If the reset signal RSB has a high logic value and a starting signal S having a high logic value during one period of a clock signal CK is input, the output of the latch circuit 130 has a high logic value, the time control signal TL is synchronized with a clock signal CK, outputs a high logic value, and the down-counter 110 starts to count.

If the output of the down-counter 110 outputs 10 decimal, the detector 120 changes from a high logic value to a low logic value, so that the latch circuit 130 will output a low logic value, the flip-flop 140 will be synchronized with the clock signal CK and output a low logic value, and the down-counter 100 will be reset. That is, the time control signal TL outputs a high logic value according to the starting signal S, is synchronized with the clock signal CK after having a high logic value, and outputs a low logic value.

While the above time control signal TL has a high logic value, the parallel processing division circuit receives dividend data ADAT<8:0> and divisor data BDAT<8:0> and outputs outcome data QUO<8:0> which is the result of the division.

In data register 200, illustrated in FIG. 4, if a reset signal RSB is low, all divisor storing data REG<8:0> are reset. If the reset signal RSB is high and a starting signal has a high logic value, each register 210, 220, 230 receives the divisor storing data REG<8:0>, inverts them, is synchronized with a clock signal CK and outputs data stored in each register 210, 220, 230 when the starting signal S is a low logic value. That is, in the parallel processing division circuit, each register is synchronized with a clock signal CK and receives a divisor data BDAT<8:0> when a starting signal S is active by a divisor data BDAT<8:0> expressing the start of division, and outputs the divisor storing data REG<8:0> which is the inverse data of the divisor data BDAT<8:0> until the outcome data of division is output.

In a data select circuit illustrated in FIG. 5, first and second control signals SHF, SP, which are the outputs of the select control signal generating circuit 340, all have a low logic value when a start signal S is a high logic value, so that each dividend data logic 310a, 320a may select a dividend data ADAT<8:0>, a dividend data logic 330 of the highest bit among the dividend data logic 310a, 320a may output a low logic value, a select data ACC<8:0> as the output of several flip-flops 310b, 320b may be synchronized with a clock signal CK and output the ADAT<8:0>, and a control data ACC<9> as the output of the last flip-flop 330b may output a low logic value.

When the starting signal S is a low logic value and a select control signal SC is a high logic value, the second select signal SP outputs a high logic value and the first control signal SHF outputs a low logic value. This allows the dividend data logic 310a of the lowest bit to have a low logic value, the dividend data logic 320a, 320b of the other bits to select a subtraction outcome data S<8:0>, a select data ACC<8:1> and a control data ACC<9> as the outputs of several flip-flops 320b, 330b to be synchronized with the clock signal CK and output a subtraction outcome data S<8:0>, and a select data ACC<0> as the output of a select register 310 having the lowest bit to output a low logic value.

When the starting signal S is a low logic value and the select control signal SC is a low logic value, the first control signal SHF, which is one of outputs of a select control signal generating circuit 340, outputs a high logic value. The second control signal SP outputs a high logic value, so that the dividend data logic 310a of the lowest bit may have a low logic value, the dividend data logic 320a, 330a of the other bits may select the output of the flip-flop of the previous branch, a select data ACC<0> of the lowest bit may be synchronized with the clock signal CK and output a low logic value, and a select data ACC<8:1> and a control data ACC<9> as the other bits may be synchronized with the clock signal CK, shift data stored at several flip-flop 310b, 320b to the left by one bit and output them.

As illustrated in FIG. 1, a subtractor 400 receives an input carry bit having a high logic value, select data ACC<8:0> and divisor storing data REG<8:0>, adds each bit and outputs an output carry bit S<9> expressing whether or overflow has been generated. As described above, because the divisor storing data REG<8:0> is data which is the inverse of the divisor data BDAT<8:0>, the subtractor 400 outputs an outcome which subtracts the divisor data BAT<8:0> from the select data ACC<8:0>. That is, the subtractor 400 performs the function: "select data ACC<8:0>–divisor data BDAT<8:0>".

As illustrated in FIG. 1, a control signal generating circuit 500 receives select data ACC<9>, output carry S<9> and a time control signal TL and outputs a select control signal SC having a high logic value when a time control signal TL has a high logic value and when select data ACC<9> or the output carry S<9> has a high logic value, and outputs a select control signal SC having a low logic value in all other cases.

In the outcome data generating circuit 600 illustrated in FIG. 6, when the time control signal TL is high, the first outcome data logic 610a selects and outputs a select control signal SC. The other outcome data logic 620a–690a, respectively select and output data stored at the flip-flop of the adjacent branch operating on the next lower bit. Flip-flops 610b–690b receive the outputs of the outcome data logics 610a–690a, are synchronized with a clock signal CK and output an outcome data QUO<8:0>. That is, when the time control signal TL is high, it receives the select control signal SC, is synchronized with the clock signal CK and shifted one bit by one bit to the left.

The shifting order is as follows: a data of the select control signal SC is stored at the third bit QUO<2> from outcome data QUO<8:0>, synchronized with the clock signal CK, shifted toward the left one bit by one bit to the bit in the next higher position, so that, after being shifted to the highest bit QUO<8> among the outcome data QUO<8:0>, it may be shifted to the lowest bit QUO<0> and then to the second bit QUO<1>.

Accordingly, in the parallel processing division circuit of the present invention illustrated in FIG. 1, outcome data QUO<7:0> represents the outcome when dividend data ADAT<8:0> is divided by a divisor data BDAT<8:0> and the highest bit QUO<8> from outcome data QUO<8:0> is discarded, resulting in an error between approximately +1.5% and −1.5%.

Figure 7:
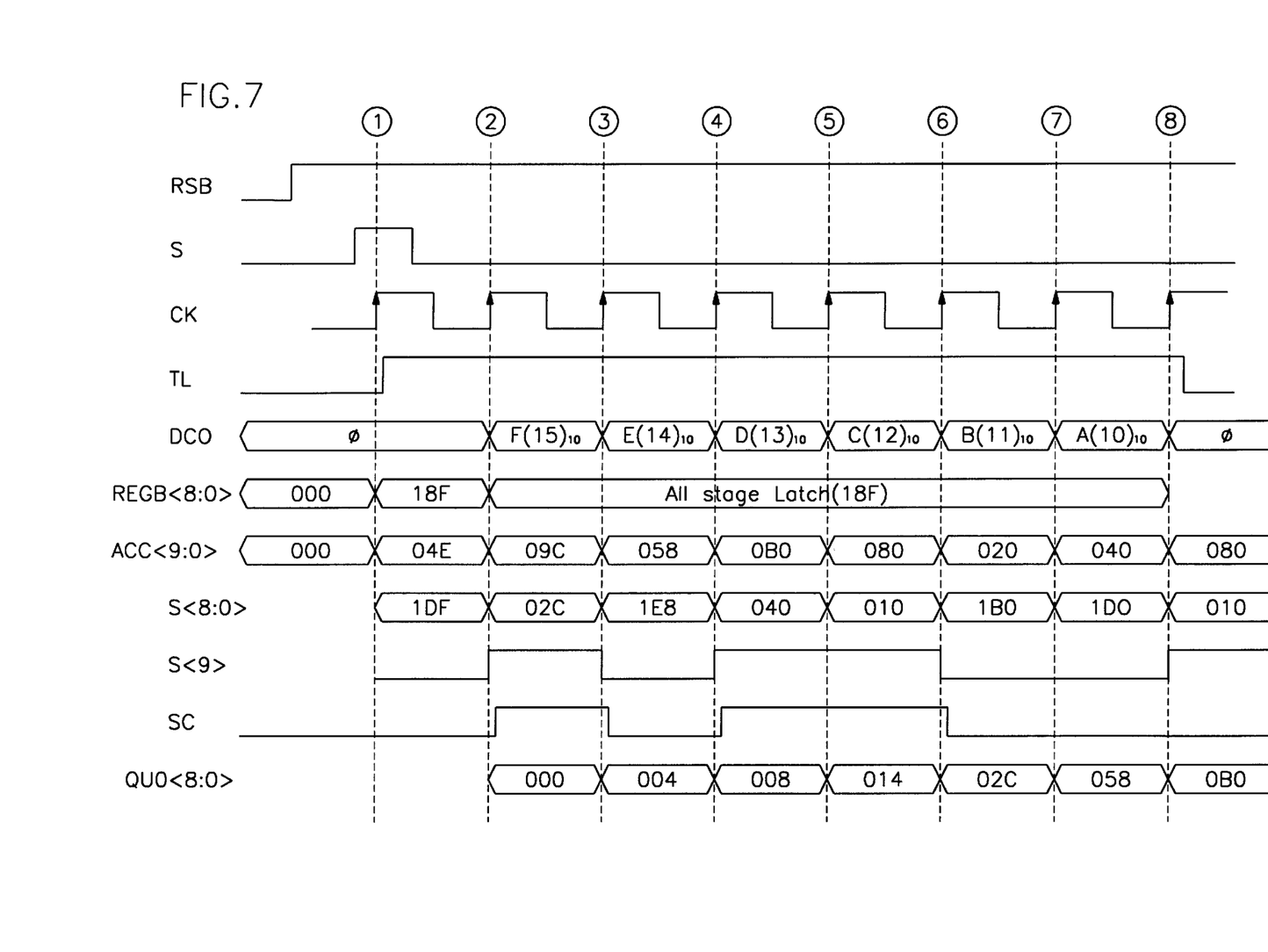
FIG. 7 is a diagram illustrating the operation-timing of the parallel processing division circuit used by the embodiment of present invention shown in FIG. 1.

FIG. 7 is a diagram illustrating the operation-timing of the parallel processing division circuit of the present invention. In the illustrated example, the dividend data ADAT<8:0> is 78 decimal (04E hexadecimal) and the divisor data BDAT<8:0> is 112 decimal (070 hexadecimal). In the following description, all data are expressed in hexadecimal.

First, the reset signal RSB inputs a low logic value to refresh the flip-flops and the latch circuits. During the refresh period, the time control signal TL from the time control circuit 100 and the select control signal SC output from the control signal generating circuit 500 output low logic values. The divisor storing data REG<8:0> output from the data register 200, the select data S<8:0> output from the data select circuit 300, the subtraction outcome data S<8:0> output from the control data ACC<9> and the subtractor 400, the outcome data QUO<8:0> output from the outcome data generating circuit 600, and output carry S<9> are all reset.

After this refresh period, the reset signal RSB inputs a high logic value.

Starting signal S receives the dividend data ADAT<8:0> and the divisor data BDAT<8:0>, and indicates the start of receipt of this data. A latch circuit 130 of the time control circuit 100 has a high logic value, the time control signal TL is synchronized with the clock signal CK and has a high logic value, and a down-counter 110 is synchronized with the next clock signal CK and begins to count. When the output of the down-counter 110 reaches 10 decimal, a detector 120 switches from high logic value to low logic value, the latch circuit 130 is reset, the time control signal TL outputs a low logic value, and the output DCO of the down-counter 110 is reset. If the dividend data and the divisor data each are N bits of data, the time control signal TL should be planed to maintain a high logic value during N−2 clock cycles. Thus, where the dividend data and divisor data are each 9 bits of information, the time control signal TL maintains a high logic value during seven clock cycles.

The divisor storing data REG<8:0> output from data register 200 is synchronized with the clock signal CK when the starting signal S is high and outputs 18F (the inverse of 010) until the outcome data QUO<8:0> is output as the result of division by latching the data, 18F, when the starting signal is low.

When the starting signal S is high, the select data ACC<8:0> is synchronized with the first clock CK and selects a dividend data ADAT<8:0>, 04E, and the control data ACC<9> has a low logic value. The subtractor 400 adds 04E with the above select data ACC<8:0>, 18F, as the divisor storing data REG<8:0>, and a high logic value which is the input carry of the subtractor 400.

That is, the subtractor 400 subtracts 010 as the divisor data BDAT<8:0> from 04E as the select data ACC<8:0>. Accordingly, the subtraction outcome data S<8:0> of the subtraction 400 is 1DF and the out carry S<9> has a low logic value. The select control signal SC which is the output of a control signal generating circuit 500 outputs a low logic value according as the above control data ACC<9> and the above output carry S<9> have a low logic value respectively while the time control signal TL has a high logic value. The outcome data QUO<8:0> which is the output of the outcome data generating circuit 600 outputs 000 as the same value with the before data.

A select data ACC<8:1> and a control data ACC<9>, which are the outputs of the data select circuit 300, are synchronized with the second clock signal CK according to a select control signal having the above low logic value and outputs a data shifted to the left by one bit. The lowest bit ACC<0> among the select data ACC<8:0> outputs a low logic value. That is, the select data ACC<8:0> outputs 09C and the control data ACC<9> outputs a low logic value. The subtraction outcome data S<8:0> of the subtractor 400 is 02C and the output carry of one has a high logic value. The control data ACC<9> has a low logic value, the output carry S<9> has a high logic value and the time control signal TL has a low logic value, so that the select control signal SC outputs a high logic value, and the outcome data QUO<8:0> is synchronized with the third clock signal and output the data of 004.

According to the select control signal SC having the above high logic value, the select data ACC<8:1> and the control data ACC<9> are synchronized with the third clock signal CK, select 02C, and the lowest bit ACC<0> among the select data has a low logic value. That is, the select data ACC<8:0> is 058 and the select data ACC<9> has a low logic value. The subtraction outcome data S<8:0> is 1E8 and the output carry S<9> has a low logic value. The above control data ACC<9> and the output carry S<9> have low logic values respectively, and also the time control signal TL has a low logic value, so that the select control signal SC outputs a low logic value, and the outcome data QUO<8:0> is synchronized with the fourth clock signal CK and output a data of 008.

According to the method as described above, the select data ACC<8:0> which are the output of the data select circuit 300 are synchronized with the fourth clock signal CK, outputs a data of 0B0, and the control data ACC<9> outputs a low logic value. The subtraction outcome data S<8:0> of the subtractor 400 is 040 and the output carry S<9> has a high logic value. The above control data ACC<9> and the output carry S<9> has a high logic value, so that the select control signal SC outputs a high logic value, and the outcome data QUO<8:0> is synchronized with the fifth clock signal CK and output a data of 014.

The select data ACC<8:0> which are the output of the data select circuit 300 are synchronized with the fifth clock signal CK, outputs a data of 080, and the control data ACC<9> outputs a low logic value. The subtraction outcome data S<8:0> of the subtractor 400 is 010 and the output carry S<9> has a high logic value. The control data ACC<9> has a low logic value and the output carry S<9> has a high logic value, so that the select control signal SC outputs a high logic value, and the outcome data QUO<8:0> is synchronized with the sixth clock signal CK and output a data of 02C.

The select data ACC<8:0> which are the output of the data select circuit 300 are synchronized with the sixth clock signal CK, outputs a data of 020, and the control data ACC<9> outputs a low logic value. The subtraction outcome data S<8:0> of the subtractor 400 is 1B0 and the output carry S<9> has a low logic value, so that the select control signal SC outputs a low logic value, and the outcome data QUO<8:0> is synchronized with the seventh clock signal CK and output a data of 058.

The select data ACC<8:0> which are the output of the data select circuit 300 are synchronized with the seventh clock signal CK, outputs a data of 040, and the control data ACC<9> outputs a low logic value. The subtraction outcome data S<8:0> of the subtractor 400 is 1D0 and the output carry S<9> has a low logic value, so that the select control signal SC outputs a low logic value, and the outcome data QUO<8:0> is synchronized with the eighth clock signal CK and outputs a data of 0B0.

The select data ACC<8:0> which are the output of the data select circuit 300 are synchronized with the eighth clock signal CK, outputs a data of 080, and the control data ACC<9> outputs a low logic value. The subtraction outcome data S<8:0> of the subtractor 400 is 010, the output carry S<9> has a high logic value, and the above time control signal TL has a low logic value, so that the select control signal SC outputs a low logic value.

This generates 0B0 as an outcome data QUO<8:0>, which is synchronized with the eighth clock signal CK and generated, and equal to 010110000 in binary form. At this time, the highest bit is discarded, leaving 10110000, which, in decimal form, may be expressed as $1*\frac{1}{2}+1*\frac{1}{8}+1*1/16=0.6875$. Also, in the above example, because the dividend data ADAT<8:0> is 76 decimal and the divisor data BDAT<8:0> is 112 decimal, the outcome of division is to be 76/112=0.6785.

Accordingly, a simple circuit can be constructed to perform division which has an associated error of only ±1.5% when compared against the ideal result.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A parallel processing division circuit, which receives dividend data, divisor data which is larger than the dividend data, a starting signal and a reset signal, comprising:

a time control circuit which receives said starting signal and a clock signal and outputs a time control signal which controls a time to output outcome data of division;

a data register which receives said divisor data and outputs divisor storing data which is the inverse of said divisor data and is synchronized with the clock signal according to the starting signal;

a data select circuit which receives said dividend data, subtraction outcome data, said starting signal and said clock signal, and which selects data which is one of said dividend data and existing subtraction outcome data which is shifted to the left one bit according to said starting signal, thereby outputting select data and control data;

a subtractor which receives said divisor storing data and said select data, performs subtraction, and outputs said subtraction outcome data and an output carry which indicates if overflow has occurred as a result of the subtraction;

a control signal generating circuit which receives said time control signal, said control data and said output carry, and outputs a select control signal having a high logic value when said time control signal has a high logic value and when one of said control data and said output carry has a high logic value; and an outcome data generating circuit which receives said time control signal, said select control signal and said clock signal, is synchronized with said clock signal according to the time control signal, stores said select control signal at the third bit and outputs outcome data by shifting the select control signal to the left one bit by one bit.

2. The parallel processing division circuit of claim 1, wherein said time control signal has a high logic value during N−2 clock cycles of said clock signal when said divisor data has N bits.

3. The parallel processing division circuit of claim 1, wherein said time control circuit further comprises:

a down-counter which reduces its contents one by one according to said clock signal;

a detector which outputs a first reset signal when an output of said down-counter has a fixed value;

a latch circuit which has a low logic value, when said reset signal or said first reset signal is active, and which outputs a high logic value when said starting signal is active; and a flip-flop which receives the output of said latch circuit and which is synchronized with said clock signal and outputs a time control signal.

4. The parallel processing division circuit of claim 3, wherein said time control signal has a high logic value during N−2 clock cycles of said clock signal when said divisor data has N bits.

5. The parallel processing division circuit of claim 3, wherein said down-counter is reset when said time control signal is a low logic value.

6. The parallel processing division circuit of claim 3, wherein said detector comprises a NAND circuit.

7. The parallel processing division circuit of claim 6, wherein, if the divisor data has 9 bits, said detector outputs a low logic value when the output of said down-counter is 10 decimal.

8. The parallel processing division circuit of claim 3, wherein, if the divisor data has 9 bits, said detector outputs a low logic value when the output of said down-counter is 10 decimal.

9. The parallel processing division circuit of claim 3, wherein said latch circuit comprises a first NOR gate having a first input, a second input and a third input, and a second NOR gate having a first input and a second input, the first input of said first NOR gate being connected to a signal which is the inverse of a reset signal, the second input of said first NOR gate being connected to a signal which is the inverse of said first reset signal, and the third input of said first NOR gate being connected to an output of the second NOR gate;

the first input of said second NOR being connected to an output of said first NOR gate and the second input of the second NOR gate being connected to a starting signal.

10. The parallel processing division circuit of claim 1, wherein said register outputs the divisor storing data when said starting signal is a high logic value.

11. The parallel processing division circuit of claim 10, wherein said data register comprises a divisor data logic which receives one bit of said divisor data when said starting signal is a high logic value, inverts said bit and outputs it, which outputs data of every stage when said starting signal is a low logic value, and a flip-flop which is synchronized with a clock signal and which outputs the output of said divisor data logic.

12. The parallel processing division circuit of claim 11, wherein said divisor data logic comprises a first AND gate which receives said starting signal and one bit of said divisor data, and performs a logical AND operation;

a second AND gate which receives an inverse of said starting signal and an inverse of the output of said flip-flop and performs a logical AND operation; and a third NOR gate which receives an output of said first AND gate and an output of said second AND gate and performs a logical NOR operation.

13. The parallel processing division circuit of claim 12, wherein said divisor data logic comprises a first AND gate which receives said starting signal and one bit of said divisor data, and performs a logical AND operation;

a second AND gate which receives an inverse of said starting signal and an inverse of the output of said flip-flop and performs a logical AND operation; and a third NOR gate which receives an output of said first AND gate and an output of said second AND gate and performs a logical NOR operation.

14. The parallel processing division circuit of claim 1, wherein said data register comprises a divisor data logic which receives one bit of said divisor data when said starting signal is a high logic value, inverts said bit and outputs it, which outputs data of every stage when said starting signal is a low logic value, and a flip-flop which is synchronized with a clock signal and which outputs the output of said divisor data logic.

15. The parallel processing division circuit of claim 14, wherein said data select circuit comprises a select control signal generating circuit which receives an inverse of said select control signal and an inverse of said starting signal, performs a logical AND operation, and outputs a first control signal, and which receives said select control signal and the inverse of said starting signal, performs a logical AND operation and outputs a second control signal; and flip-flops which receive several dividend logics which are one more than said dividend data bits, and each output of them, is synchronized with said clock signal and outputs them, at this time, said dividend logic selects said dividend data, said subtraction outcome data or the output of flip-flop of the branch according to said first control signal, said second control signal and said starting signal.

16. The parallel processing division circuit of claim 1, wherein said data select circuit selects said dividend data when said starting signal is a high logic value, selects a data shifted an existing selected data to the left one bit by one bit when said starting signal is a low logic value and said select control signal is a low logic value, and selects a data shifted subtraction outcome data to the left one bit by one bit when said starting signal is a low logic value and said control signal is a high logic value.

17. The parallel processing division circuit of claim 1, wherein said data select circuit comprises a select control signal generating circuit which receives an inverse of said select control signal and an inverse of said starting signal, performs a logical AND operation, and outputs a first control signal, and which receives said select control signal and the inverse of said starting signal, performs a logical AND operation and outputs a second control signal; and flip-flops which receive several dividend logics which are one more than said dividend data bits, and each output of them, is synchronized with said clock signal and outputs them, at this time, said dividend logic selects said dividend data, said subtraction outcome data or the output of flip-flop of the branch according to said first control signal, said second control signal and said starting signal.

18. The parallel processing division circuit of claim 17, wherein the logic of the lowest bit among said dividend logic comprises a third AND gate which receives the lowest bit of said dividend data and said starting signal, and performs a logical AND operation;

the logic of the highest bit comprises:

a first NAND gate which receives the output of the flip-flop of an adjacent branch and said first control signal, and performs a logical NAND operation;

a second NAND gate which receives the highest bit of said subtraction outcome data and said second control signal, and performs a logical NAND operation; and a third NAND gate which receives the outputs of said first NAND gate and said second NAND gate, and performs a logical NAND operation; and wherein the other dividend data logic comprise:

a fourth NAND gate which receives the output of the flip-flop of an adjacent branch and said first control signal, and performs a logical NAND operation;

a fourth AND gate which receives one bit of said subtraction outcome data, but not the highest bit of said subtraction outcome data, and said second control signal, and performs a logical AND operation;

a fifth AND gate which receives said starting signal and one bit of dividend data, but not the lowest bit of said dividend data, and performs a logical AND operation;

a fourth NOR gate which receives an output of said fourth AND gate and an output of said fifth AND gate and performs a logical NOR operation; and a fifth NAND gate which receives the output of said fourth NAND gate and the output of said fourth NOR gate and performs a logical NAND operation.

19. The parallel processing division circuit of claim 1, wherein said control signal generating circuit comprises a fifth NOR gate which receives said control data and said output carry, and performs a logical NOR operation; and a sixth NOR which receives an inverse of said time control signal and an output of said fifth NOR, and which performs a logical NOR operation.

20. The parallel processing division circuit of claim 1, wherein said outcome data generating circuit is synchronized with the clock signal, stores at the third bit and shifted one bit by one bit to the left when the time control signal is high logic value, and latches an existing stored data when said time control signal is a low logic value.

21. The parallel processing division circuit of claim 20, wherein said outcome data generating circuit shifts N−2 times when said divisor data contains N bits of data.

22. The parallel processing division circuit of claim 20, wherein said outcome data generating circuit comprises flip-flops which receive outcome data logic and each output of them, being synchronized with said clock signal and outputting them;

the first outcome data logic among said outcome data logics, comprises:

a sixth AND gate which receives said time control signal and said select control signal, and performs a logical AND operation;

a seventh AND gate which receives an inverse of said time control signal and an output from the second flip-flop from among said several flip-flops, and performs a logical AND operation; and a first OR gate which receives the output of said sixth AND gate and the output of said seventh AND gate and performs a logical OR operation; and wherein the other outcome data logics respectively comprise:

an eighth AND gate which receives said time control signal and an output of a flip-flop from an adjacent branch, and performs a logical AND operation;

a ninth AND gate which receives the inverse of said time control signal and an output of the flip-flop storing the output of said outcome data logic and performs a logical AND operation; and a second OR gate which receives the output of said eighth AND gate and the output of said ninth AND gate and performs a logical OR operation.

23. The parallel processing division circuit of claim 1, wherein said outcome data generating circuit shifts N−2 times when said divisor data contains N bits of data.

24. The parallel processing division circuit of claim 1, wherein said outcome data generating circuit comprises flip-flops which receive outcome data logic and each output of them, being synchronized with said clock signal and outputting them;

the first outcome data logic among said outcome data logic, comprises:

a sixth AND gate which receives said time control signal and said select control signal, and performs a logical AND operation;

a seventh AND gate which receives an inverse of said time control signal and an output from the second flip-flop from among said several flip-flops, and performs a logical AND operation; and a first OR gate which receives the output of said sixth AND gate and the output of said seventh AND gate and performs a logical OR operation; and wherein the other outcome data logics respectively comprise:

an eighth AND gate which receives said time control signal and an output of a flip-flop from an adjacent branch, and performs a logical AND operation;

a ninth AND gate which receives the inverse of said time control signal and an output of the flip-flop storing the output of said outcome data logic and performs a logical AND operation; and a second OR gate which receives the output of said eighth AND gate and the output of said ninth AND gate and performs a logical OR operation.

25. A method of performing parallel processing divisions, by receiving dividend data, divisor data which is larger than the dividend data, a starting signal and a reset signal, the method comprising the steps of:

a time control signal generating step generating a signal which is synchronized with a clock signal and has a high logic value when said starting signal is active, and performing division when said starting signal has a low logic value;

a first subtraction step receiving said dividend data when said starting signal is active, subtracting said divisor data from said dividend data, and outputting subtraction outcome data and an output carry indicative of overflow;

a first shift step receiving and shifting said dividend data one bit to the left if said output carry has a low logic value in said first subtraction step, and outputting a first dividend data which is a low logic value and is to be input to the lowest bit;

a second shift step receiving and shifting said subtraction outcome data one bit to the left if said output carry has a high logic value, and outputting a second dividend data which is a low logic value and is to be input to the lowest bit;

a second subtraction step receiving and subtracting said divisor data from one of said first dividend data and said second dividend data; and a circulation shift step including:

performing said first shift step and said second subtraction step if an output carry has a high logic value or the highest bit of said first dividend data or second dividend data has a high logic value in said second subtraction step until said time control signal has a low logic value, performing said first shift step and said subtraction step if said output carry and the highest bit of said first dividend or said second dividend data has all a low logic value, inputting a low logic value to a third bit if said first shift step is performed until said time control signal has a low logic value, and inputting a high logic value to the third bit and performs the circulation shift to the left 1 bit by 1 bit if said second shift step is performed.

26. The method of performing parallel processing divisions of claim 25, wherein said circulation shift step performs N−2 of shifts if said divisor data contains N bit.

* * * * *